United States Patent
Nakano et al.

(10) Patent No.: US 7,016,290 B2
(45) Date of Patent: Mar. 21, 2006

(54) READOUT METHOD AND APPARATUS FOR OPTICAL INFORMATION MEDIUM

(75) Inventors: Takashi Nakano, Ibaraki (JP); Hisako Fukuda, Ibaraki (JP); Junji Tominaga, Ibaraki (JP); Nobufumi Atoda, Ibaraki (JP); Takashi Kikukawa, Tokyo (JP)

(73) Assignees: TDK Corporation, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 529 days.

(21) Appl. No.: 10/270,047

(22) Filed: Oct. 15, 2002

(65) Prior Publication Data

US 2003/0107977 A1 Jun. 12, 2003

(30) Foreign Application Priority Data

Oct. 15, 2001 (JP) .............................. 2001-317507

(51) Int. Cl.
*G11B 7/00* (2006.01)
(52) U.S. Cl. .............................. 369/110.04; 369/112.16
(58) Field of Classification Search .......... 369/110.01, 369/110.02, 110.04, 112.16, 110.03, 109.2
See application file for complete search history.

(56) References Cited

U.S. PATENT DOCUMENTS 5,528,575 A * 6/1996 Saito ..................... 369/110.02

FOREIGN PATENT DOCUMENTS

| JP | 5-205314 | 8/1993 |
|---|---|---|
| JP | 8-96412 | 4/1996 |
| JP | 2844824 | 10/1998 |
| JP | 10-340482 | 12/1998 |
| JP | 11-86342 | 3/1999 |
| JP | 2001-250274 | 9/2001 |

OTHER PUBLICATIONS

Takashi Kikukawa, et al., "High-Density Read-Only Memory Disc With Super Resolution Reflective Layer", Jpn. J. Appl. Phys., vol. 40, Part 1, No. 3B, Mar. 2001, pp. 1624-1628, no day.

* cited by examiner

*Primary Examiner*—Nabil Hindi
(74) *Attorney, Agent, or Firm*—Oblon, Spivak, McClelland, Maier & Neustadt, P.C.

(57) ABSTRACT

In an optical information medium comprising an information recording layer having a mark train of marks and spaces, the mark train is read out by scanning it with a laser beam and detecting a light intensity change pattern of reflected laser beam. Provided that the reflected laser beam includes polarized light components which define an angle $\theta$ with the mark train, a polarized light component giving $\theta=0$ is $x_0$ component, and a polarized light component giving $\theta=90°$ is $y_0$ component, the mark train is read out utilizing at least a light intensity change of $x_0$ component. When pits or recorded marks having a size approximate to or below the resolution limit are read out, the present invention allows high read outputs to be obtained and prevents omission of readout signals.

18 Claims, 4 Drawing Sheets

(B)

$Y_0$ (C)

$X_0$ (D)

$X_0 - \alpha_{LM} Y_0$ (B)
$Y_0$ (C)
$X_0$ (D)
$X_0 - \alpha_{LM} Y_0$

READOUT METHOD AND APPARATUS FOR OPTICAL INFORMATION MEDIUM

This invention relates to a method and apparatus for reading out information in an optical information medium.

BACKGROUND OF THE INVENTION

Optical information media include read-only optical disks such as compact disks, rewritable optical recording disks such as magneto-optical recording disks and phase change optical recording disks, and write-once optical recording disks using organic dyes as the recording material.

In general, optical information media can have an increased information density. Nowadays, optical information media are required to further increase their information density in order to process a vast quantity of information data as in images. The information density per unit area can be increased either by narrowing the track pitch or by reducing the interval between recorded marks or pits to increase a linear density. However, if the linear density is too high relative to the beam spot of reading light, the carrier-to-noise (C/N) ratio lowers, eventually to a level where signals are unreadable. The resolution upon signal readout is determined by the diameter of a beam spot. More illustratively, provided that the reading light has a wavelength $\lambda$ and the optical system of the readout apparatus has a numerical aperture NA, the spatial frequency $2NA/\lambda$ generally becomes a resolution limit. Accordingly, reducing the wavelength of reading light and increasing the NA are effective means for improving the C/N and resolution upon readout. A number of technical studies that have been made thus far reveal that many technical problems must be solved before such effective means can be introduced.

Under the circumstances, several methods have been proposed for going over the resolution limit (or diffraction limit) determined by light diffraction. They are generally known as super-resolution readout methods.

The most common super-resolution readout method is to form a mask layer over a recording layer. Based on the fact that a laser beam defines a spot having an intensity distribution approximate to the Gaussian distribution, an optical aperture smaller than the beam spot is formed in the mask layer whereby the beam spot is reduced below the diffraction limit. This method is generally divided into a heat mode and a photon mode, depending on the optical aperture-forming mechanism.

The heat mode is such that upon irradiation to a beam spot, the mask layer changes its optical properties in a region whose temperature is raised above a certain value. The heat mode is utilized, for example, in the optical disk disclosed in JP-A 5-205314. This optical disk has on a transparent substrate in which optically readable recorded pits are formed in accordance with information signals, a layer of a material whose reflectance changes with temperature. That is, the material layer serves as a mask layer. The elements described in JP-A 5-205314 as the material of which the mask layer is constructed are lanthanoids, with Tb being used in Examples. In the optical disk of JP-A 5-205314, when reading light is irradiated, the reflectance of the material layer changes due to temperature distribution within the scanned spot of the reading light. After reading operation, the reflectance resumes the initial state as the temperature lowers. It never happens that the material layer be melted during reading. Another known example of the heat mode is a medium capable of super-resolution readout, as disclosed in Japanese Patent No. 2,844,824, the medium having a mask layer of an amorphous-crystalline phase transition material in which a high-temperature region created within a beam spot is transformed into crystal for increasing the reflectance. This medium, however, is impractical in that after reading, the mask layer must be transformed back to amorphous.

The heat mode media require that the power of reading light be strictly controlled in consideration of various conditions including the linear velocity of the medium since the size of the optical aperture depends solely on the temperature distribution in the mask layer. This, in turn, requires a complex control system and hence, an expensive medium drive. The heat mode media also suffer from the problem that reading characteristics degrade with the repetition of reading operation because the mask layer is prone to degradation by repetitive heating.

On the other hand, the photon mode is such that upon exposure to a beam spot, the mask layer changes its optical properties in a region whose photon quantity is increased above a certain value. The photon mode is utilized, for example, in the information recording medium of JP-A 8-96412, the optical recording medium of JP-A 11-86342, and the optical information recording medium of JP-A 10-340482. More illustratively, JP-A 8-96412 discloses a mask layer formed of phthalocyanine or a derivative thereof dispersed in a resin or inorganic dielectric, and a mask layer formed of a chalcogenide. JP-A 11-86342 uses as the mask layer a super-resolution readout film containing a semiconductor material having a forbidden band which upon exposure to reading light, is subject to electron excitation to the energy level of excitons to change light absorption characteristics. One illustrative mask layer is CdSe microparticulates dispersed in a $SiO_2$ matrix. JP-A 10-340482 uses as the mask layer a glass layer in which the intensity distribution of transmitted light varies non-linearly with the intensity distribution of irradiated light.

Unlike the super-resolution readout media of the heat mode, the super-resolution readout media of the photon mode are relatively resistant to degradation by repetitive reading.

In the photon mode, the region whose optical characteristics change is determined by the number of incident photons which in turn, depends on the linear velocity of the medium relative to the beam spot. Also in the photon mode, the size of an optical aperture depends on the power of reading light, indicating that supply of an excessive power makes so large an optical aperture that super-resolution readout may become impossible. Therefore, the photon mode also requires to strictly control the power of reading light in accordance with the linear velocity and the size of pits or recorded marks (objects to be read out). Additionally, the photon mode requires to select the mask layer-forming material in accordance with the wavelength of reading light. That is, the photon mode media are rather incompatible with multi-wavelength reading.

Under the circumstances, JP-A 2001-250274 proposes a medium comprising a layer (functional layer) made of a specific material such as Si and having a specific thickness corresponding to the specific material. This medium enables to read out pits or recorded marks of a size which is below the resolution limit determined by light diffraction.

The medium of JP-A 2001-250274 is expected to find practical use because a carrier-to-noise ratio (CNR) of about 40 dB is available in reading out pits of a size which is below the resolution limit. Regrettably, the patent lacks the disclosure of an optimum method for enhancing read outputs.

It is reported in Jpn. J. Appl. Phys., Vol. 40 (2001), pp. 1624–1628 that in the readout operation on the medium of JP-A 2001-250274, some readout signals are omitted (which are a certain arrangement pattern of pits and spaces (which are regions between two adjacent pits). The pit train of alternately arranged pits and spaces usually includes pits and spaces of differing lengths depending on a particular modulation system used, and these pits and spaces are arranged in a pattern compliant with the modulation system and the information to be recorded. If the arrangement pattern which causes some readout signals to be omitted is identified, then the modulation system can be devised such that the signal-omitting arrangement pattern may not develop. However, the resulting modulation system has increased redundancy and is detrimental to the efforts of increasing the capacity of media. All the patent and literature references cited above are incorporated herein by reference.

SUMMARY OF THE INVENTION

An object of the invention is to provide a readout method for an optical information medium having pits or recorded marks of a size approximate to or below the resolution limit determined by the diffraction theory, which method produces high and accurate read outputs; and a readout apparatus for use in the readout method.

The above and other objects are attained by the present invention which is defined below.

(1) An information readout method for an optical information medium comprising an information recording layer having a mark train of marks and spaces, said method comprising the steps of scanning the mark train with a laser beam, and reading out the mark train on the basis of a light intensity change pattern of reflected laser beam, wherein provided that the laser beam reflected by the mark train includes polarized light components which define an angle $\theta$ with the mark train, a polarized light component giving $\theta=0°$ is designated $x_0$ component, and a polarized light component giving $\theta=90°$ is designated $y_0$ component, the mark train is read out utilizing at least a light intensity change of $x_0$ component.

(2) The information readout method of (1) wherein linearly polarized light having an angle $\theta$ of from 0° to less than 90° is taken out of the laser beam reflected by the mark train, and the mark train is read out utilizing at least a light intensity change of said linearly polarized light.

(3) The information readout method of (1) wherein linearly polarized light having an angle $\theta$ of from 0° to less than 45° is taken out of the laser beam reflected by the mark train, and the mark train is read out utilizing at least a light intensity change of said linearly polarized light.

(4) The information readout method of (1) wherein linearly polarized light having an angle $\theta$ of from 0° to 5° is taken out of the laser beam reflected by the mark train, and the mark train is read out utilizing at least a light intensity change of said linearly polarized light.

(5) The information readout method of any one of (1) to (4) wherein the mark train includes plural types of marks having different lengths and plural types of spaces having different lengths, and the mark train is read out on the basis of a difference between the light intensity change pattern of $x_0$ component and the light intensity change pattern of $y_0$ component.

(6) The information readout method of (5) wherein two types of linearly polarized light having different $\theta$ are taken out of the laser beam reflected by the mark train, of the two types of linearly polarized light, one having smaller $\theta$ is designated x polarized light and the other having larger $\theta$ is designated y polarized light, the mark train is read out on the basis of a change of the value obtained by subtracting a multiple of the intensity of y polarized light from the intensity of x polarized light, whereby those marks and/or spaces which cannot be read out solely with x polarized light are read out.

(7) The information readout method of (6) wherein provided that the intensity of x polarized light is X, the intensity of y polarized light is Y, and X/Y corresponding to the longest mark is $\alpha_{LM}$, the mark train is read out on the basis of a change of $(X-\alpha_{LM}Y)$.

(8) The information readout method of (6) or (7) wherein the angle $\theta$ for x polarized light is from 0° to less than 45°, and the angle $\theta$ for y polarized light is from more than 45° to 90°.

(9) The information readout method of (6) or (7) wherein the angle $\theta$ for x polarized light is from 0° to 5°, and the angle $\theta$ for y polarized light is from 85° to 90°.

(10) The information readout method of any one of (1) to (9) wherein the laser beam having a wavelength $\lambda$ is irradiated to the mark train through an objective lens having a numerical aperture NA for reading out the mark train, and the minimum length $M_L$ of the marks is up to $0.36\lambda/NA$.

(11) The information readout method of any one of (1) to (9) wherein the laser beam having a wavelength $\lambda$ is irradiated to the mark train through an objective lens having a numerical aperture NA for reading out the mark train, and the minimum length $M_L$ of the marks is less than $0.25\lambda/NA$.

(12) The information readout method of any one of (1) to (11) wherein the marks are formed by changes in shape and/or property of the information recording layer.

(13) A readout apparatus for use in the information readout method of any one of (1) to (12), comprising at least means for detecting linearly polarized light including $x_0$ component.

(14) The readout apparatus of (13) wherein the means is capable of independently detecting two types of linearly polarized light having different $\theta$.

DESCRIPTION OF THE PREFERRED EMBODIMENT

Figure 1A:
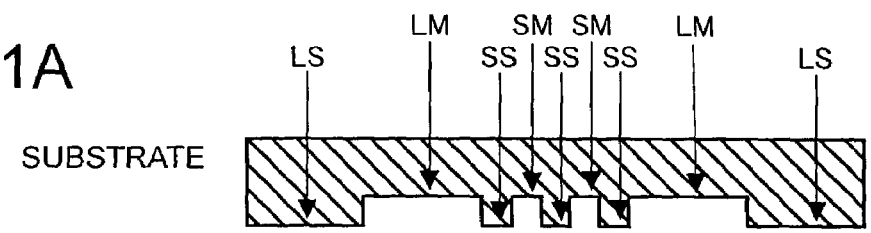
FIG. 1A is a cross-sectional view of the pattern of one mark train used for simulation.

As used herein, the mark train is present within an information recording layer and consists of a series of marks and spaces (which are regions between two adjacent marks). As the mark train is scanned with a laser beam, the light intensity of reflected laser beam changes in accordance with the arrangement of marks and spaces to provide a pattern.

The marks that bring about such changes of reflected light intensity can be formed by changes in shape and/or property of the information recording layer. The marks formed by changes in shape of the information recording layer are, for example, pits in read-only optical disks. The marks formed by changes in property of the information recording layer are, for example, amorphous recorded marks in phase change optical recording disks. The marks formed by changes in shape and property of the information recording layer are, for example, pits in write-once optical recording disks having an organic dye-containing information recording layer where the pits are formed.

Reference is now made to the resolution limit determined by the diffraction theory. An optical system delivers a laser beam through an objective lens to the mark train in the information recording layer of the medium. The resolution limit is determined by the wavelength of the laser beam and the numerical aperture of the objective lens. Assume that $\lambda$ is the wavelength of the reading laser beam and NA is the numerical aperture of the objective lens. Since the cutoff spatial frequency is $2NA/\lambda$, a mark train in which marks and spaces have an equal length are readable as long as the spatial frequency is equal to or below $2NA/\lambda$ (line pairs/nm). The mark length (=space length) corresponding to the readable spatial frequency is given as $$\lambda/4NA = 0.25\lambda/NA.$$

It is then concluded that super-resolution readout is possible if a mark train whose minimum mark length $M_L$ is less than $0.25\lambda/NA$ can be read out.

Making studies on the super-resolution readout mechanism of reading out a mark train of minute marks and spaces of a size below the resolution limit in the medium described in the above-referred JP-A 2001-250274 and Jpn. J. Appl. Phys., Vol. 40 (2001), pp. 1624–1628, the present inventors have discovered that super-resolution readout is closely correlated to the angle between the mark train and the oscillation or polarization direction of an electric field vector of a reading laser beam. Herein, the angle defined between the mark train and the polarization direction is represented by $\theta$. Also herein, $\theta$ is an acute angle, that is, in the range of 0° to 90°.

The medium of interest is one including a functional layer capable of super-resolution readout having a mark train of minute marks and spaces of a size below the resolution limit. The inventors have empirically found that the mark train can be read out when retrieval is carried out with a laser beam whose polarization direction is parallel to the mark train (i.e., $\theta=0°$). By contrast, the mark train cannot be read out when retrieval is carried out on the same medium using a laser beam whose polarization direction is perpendicular to the mark train (i.e., $\theta=90°$).

Now a simulation model is used to describe that the readout of a mark train consisting of minute marks and spaces is dependent on the polarization direction of a reading laser beam; and to describe a signal processing method necessary to carry out super-resolution readout to produce high, accurate outputs, utilizing the dependency.

For the simulation, a finite difference time domain method was used. The medium used had a substrate bearing a mark train in its surface and a Si layer of 20 nm thick formed thereon. The mark train included short marks and short spaces both having a length of 200 nm and long marks and long spaces both having a length of 800 nm. Each mark is a pit of 60 nm deep and 200 nm wide. The pit has end walls which are semi-circular and side walls which extend perpendicular to the substrate surface. The Si layer extends to the side walls of the pits while keeping its thickness of 20 nm. The substrate has a refractive index of 1.56; Si has a complex refractive index of 3.88+0.02i; and air has a refractive index of 1. The laser beam used for reading has a wavelength of 650 nm. The objective lens of the laser beam delivery optical system has a numerical aperture of 0.60. The length of long marks and spaces is greater than the resolution limit ($0.25\lambda/NA=271$ nm), and the length of short marks and spaces is less than the resolution limit.

In carrying out simulation, the medium was divided into sections having planar dimensions of 20 nm×20 nm and a depth of 3 nm. For each section, the distribution of an electromagnetic field created within the medium by irradiating a laser beam was determined. Based on this distribution, the total intensity of reflected light from all the sections falling within the beam spot was determined. With this simulation, the sum of the reflected light intensity dependent on the electromagnetic field distribution and the reflected light intensity dependent on optical diffraction and reflection is obtainable, but the reflected light intensity dependent on optical interference by medium surface irregularities is not obtainable.

In the mark train, marks and spaces are arranged in a pattern as shown in FIG. 1A. In FIG. 1A, SM, SS, LM and LS stand for short marks, short spaces, long marks and long spaces, respectively.

In this simulation, the reflected light from the mark train contains polarized light components. Of the polarized light components, a polarized light component having $\theta=90°$ is designated $y_0$ component having a light intensity $Y_0$, and a polarized light component having $\theta=0°$ is designated $x_0$ component having a light intensity $X_0$.

Figure 1B:
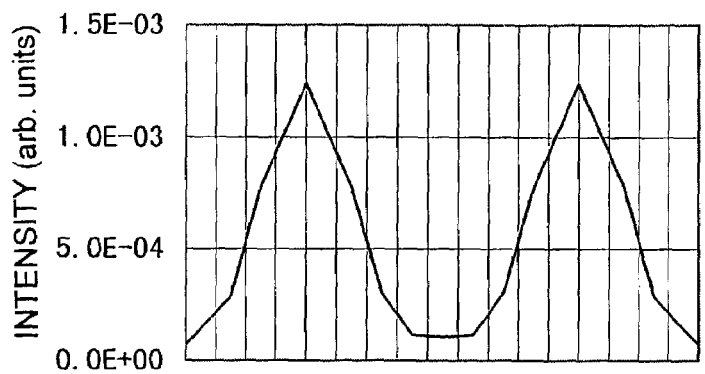
FIG. 1B is a graph showing the light intensity $Y_0$ of $y_0$ component.
Figure 1C:
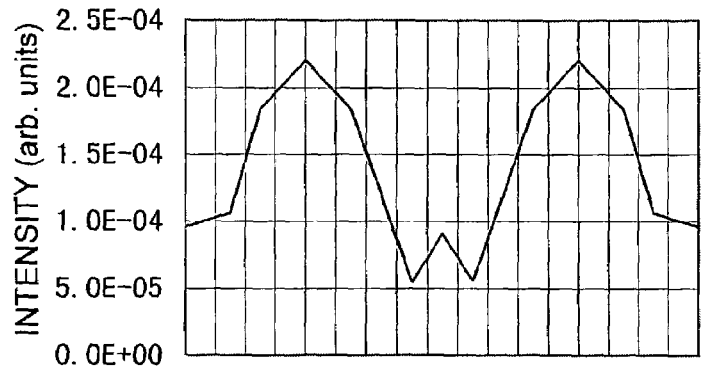
FIG. 1C is a graph showing the light intensity $X_0$ of $x_0$ component.

FIGS. 1B and 1C show changes of the intensity of $Y_0$ and $X_0$, respectively. In FIGS. 1B and 1C, the ordinate represents the intensity of $Y_0$ and $X_0$, and the abscissa represents positions corresponding to the mark train shown in FIG. 1A.

Attention is first paid to five, in total, short marks and short spaces alternately arranged near the center of the substrate in FIG. 1A (referred to as "short mark-and-space train," hereinafter). Long marks are located at opposite ends of the short mark-and-space train. In FIG. 1B showing changes of the intensity of $Y_0$, any intensity change corresponding to short marks in the short mark-and-space train is not ascertained, but a broad intensity drop is ascertained as if spaces substantially longer than the short spaces were present. On the other hand, in FIG. 1C showing changes of the intensity of $X_0$, intensity drops corresponding to two short marks in the short mark-and-space train is ascertained. As understood from these results, at least $x_0$ component must be used in order to read out marks of a size smaller than the resolution limit.

It is noted that although five peaks indicative of intensity changes corresponding to the short mark-and-space train must appear by nature, only three peaks are ascertained in FIG. 1C at positions corresponding to the short mark-and-space train. In the event of a mark train including a short mark which is separated from a long mark by a short space (which is referred to as "long mark-adjoining short mark," hereinafter) as in this short mark-and-space train, an apparent signal omission occurs. More specifically, it becomes impossible to independently detect a light intensity change associated with a short space located between a short mark and a long mark. Then, in reading out such a mark train which can induce signal omission, signal processing must be properly modified.

Next, it is described how to recover the signals omitted in proximity to the long mark-adjoining short mark.

In FIG. 1C showing the intensity change of $X_0$, the $X_0$ intensity change pattern corresponding to short marks and short spaces in the short mark-and-space train is reverse to the pattern corresponding to long marks and long spaces. That is, in the train of long marks and long spaces, the intensity increases at marks and decreases at spaces, whereas in the short mark-and-space train, the intensity decreases at marks and increases at spaces. It is thus presumed that the intensity increase of $X_0$ by a short space located at each end of the short mark-and-space train is buried or hidden in the intensity increase of $X_0$ by a long mark.

On the other hand, in FIG. 1B showing the intensity change of $Y_0$, the intensity change pattern is similar to that of FIG. 1C except that a intensity change corresponding to the short mark-and-space train is not ascertained. It is notable that the maximum light intensity of $Y_0$, is about 5 times the maximum light intensity of $X_0$. It is presumed from these results that a intensity change corresponding to the short mark-and-space train can be extracted if appropriate processing is made such that the light intensity change pattern associated with long marks and long spaces, that is, the change pattern common to $X_0$ and $Y_0$, is eliminated from the light intensity change pattern of $X_0$ shown in FIG. 1C. To this end, subtraction operation of subtracting a multiple of $Y_0$ from $X_0$ may be carried out. Provided that the multiple of $Y_0$ used in the subtraction operation is $\alpha Y_0$, $\alpha$ may be determined as appropriate in accordance with the construction of the medium and the construction of the mark train such that a light intensity change associated with a short space located between a short mark and a long mark may develop as a result of the subtraction operation.

Figure 1D:
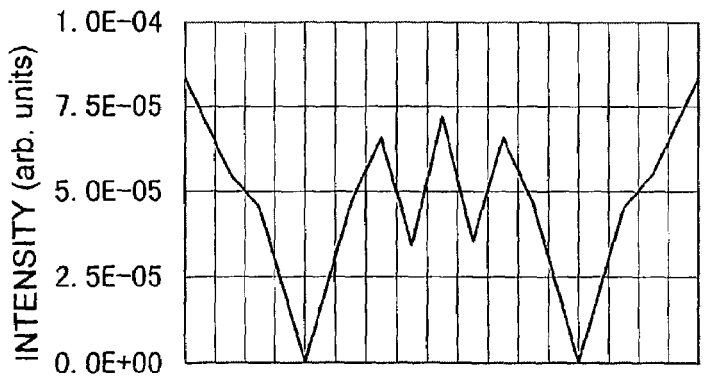
FIG. 1D is a graph of $(X_0-\alpha Y_0)$.

Although an appropriate value of $\alpha$ can be experimentally determined, it is recommended that the value of $X_0/Y_0$ at the long mark be employed as $\alpha$ when $X_0$ and $Y_0$ change as shown in FIGS. 1B and 1C, respectively. In this event, for the long mark, $X_0-\alpha Y_0=X_0-X_0=0$. Provided that $X_0/Y_0$ at the long mark is $\alpha_{LM}$, $(X_0-\alpha_{LM}Y_0)$ is shown in FIG. 1D. In FIG. 1D, the abscissa represents positions corresponding to the mark train shown in FIG. 1A, like FIGS. 1B and 1C, and $\alpha_{LM}$ is 0.178.

$(X_0-\alpha_{LM}Y_0)$ is a value obtained by extracting the difference between the intensity change pattern of $X_0$ and the intensity change pattern of $Y_0$, using the reflected light intensity from the long mark as a reference. Then, the curve of $(X_0-\alpha_{LM}Y_0)$ shown in FIG. 1D definitely reveals the changes of a minute amplitude which have been buried in the changes of a large amplitude in FIG. 1C, that is, intensity changes of all marks and spaces in the short mark-and-space train.

Also, since $(X_0-\alpha_{LM}Y_0)>0$ stands at the long spaces, the pattern of intensity change is reversed for both the long marks and the long spaces, as compared with the $X_0$ signal shown in FIG. 1C. That is, in the curve of $(X_0-\alpha_{LM}Y_0)$, the intensity lowers at long marks, but increases at long spaces. On the other hand, the intensity change pattern associated with the short mark-and-space train is such that the intensity lowers at marks, but increases at spaces as in FIG. 1C. As a result, in the curve of $(X_0-\alpha_{LM}Y_0)$, all the long marks, long spaces and short mark-and-space train show a light intensity change pattern similar to that of phase pits in prior art optical information media.

It is noted that the subtraction operation of computing $(X_0-\alpha_{LM}Y_0)$ is preferably applied in the situation where $(X_0-\alpha_{LM}Y_0)>0$ stands at long spaces.

While $\alpha_{LM}$ is one example of $\alpha$ as described above, $\alpha$ may take a value other than $\alpha_{LM}$ even when $X_0$ and $Y_0$ change as shown in FIGS. 1B and 1C, respectively. Note that $\alpha$ must be determined while taking care such that the intensity change pattern that the intensity lowers at marks and increases at spaces in the short mark-and-space train is not reversed.

Figure 2A:
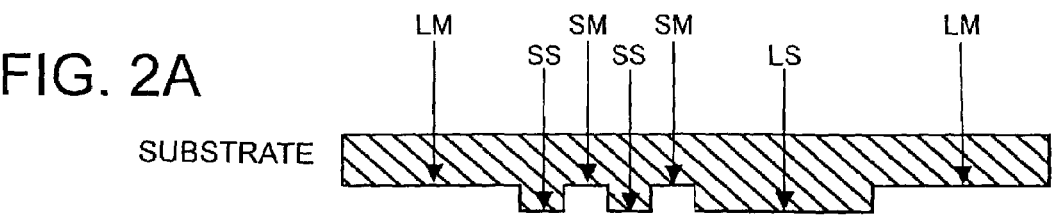
FIG. 2A is a cross-sectional view of the pattern of another mark train used for simulation.
Figure 2B:
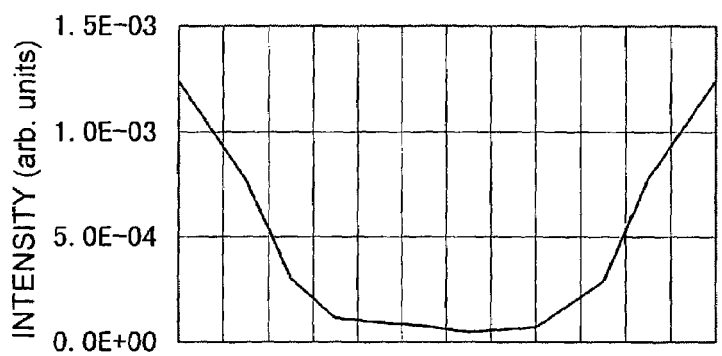
FIG. 2B is a graph showing the light intensity $Y_0$ of $y_0$ component.
Figure 2C:
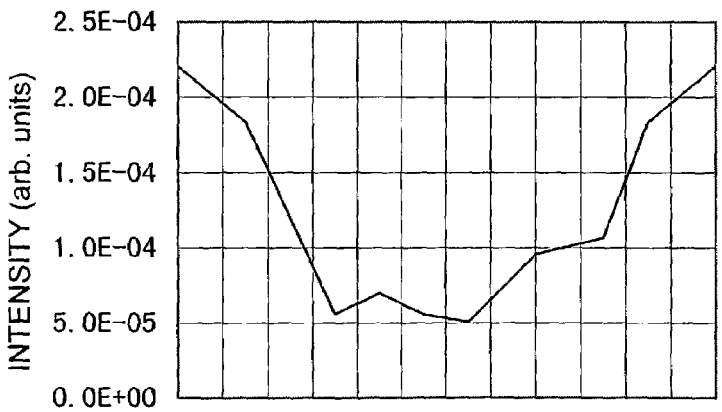
FIG. 2C is a graph showing the light intensity $X_0$ of $x_0$ component.
Figure 2D:
FIG. 2D is a graph of $(X_0-\alpha Y_0)$.

Next, simulation was carried out as above on a mark train having the arrangement pattern shown in FIG. 2A. The results are shown in FIGS. 2B, 2C and 2D. In FIGS. 2B, 2C and 2D, the ordinate represents the intensity of $Y_0$, $X_0$ and $(X_0-\alpha_{LM}Y_0)$, and the abscissa represents positions corresponding to the mark train shown in FIG. 2A. In this case, $\alpha_{LM}$ is 0.237.

In the mark train shown in FIG. 2A, attention is paid to a short mark-and-space train consisting of two short marks and two short spaces alternately arranged near the center of the substrate. Although four peaks indicative of intensity changes must appear from this short mark-and-space train by nature, only two peaks are ascertained in FIG. 2C at positions corresponding to the short mark-and-space train. Specifically, as in FIG. 1C, a light intensity change corresponding to the short space located at one end of the short mark-and-space train is omitted, and a light intensity change corresponding to the short mark located at the other end is omitted as well. It is seen from this result that an apparent signal omission also occurs in a mark train including a short space which is separated from a long space by a short mark (which is referred to as "long space-adjoining short space," hereinafter). More specifically, it becomes impossible to independently detect a light intensity change associated with a short mark located between a short space and a long space.

Such signal omission occurs presumably because a intensity increase of $X_0$ by a short mark located between a short space and a long space is buried in a intensity decrease of $X_0$ by a long space. This is evident from the fact that all four peaks corresponding to the short mark-and-space train definitely appear in the curve of $(X_0-\alpha_{LM}Y_0)$ shown in FIG. 2D.

It is appreciated from the results of both the aforementioned simulation models that those marks and/or spaces, which have not been read out only with $x_0$ polarized light, can be read out utilizing $(X_0-\alpha_{LM}Y_0)$.

From the results of these simulation models, the super-resolution readout mechanism on the medium having the aforementioned functional layer is presumed as below.

In a medium of the type wherein reflectance changes at marks are utilized for readout, the recorded information is reproduced by scanning a mark train with a laser beam, the intensity of reflected light changing in accordance with the arrangement pattern of marks and spaces, and detecting changes of reflected light intensity for thereby reading out the mark train. However, with respect to a mark train in which arrangement intervals are below the resolution limit, reflectance changes corresponding to the arrangement pattern of marks and spaces cannot be detected, and reproduction is impossible.

It is believed that when the mark train is scanned with a laser beam, interaction occurs between the electric field of the laser beam and the medium, depending on many parameters including the shape of marks (including a three-dimensional shape), the dimensions of marks and spaces, and the refractive index of the material of which marks and spaces are made. Presumably, the localization of the electric field is enhanced particularly in proximity to the outer periphery of a mark. It is then presumed that on scanning a mark train with a laser beam, the aforementioned interaction changes in accordance with the arrangement pattern of marks and spaces and that change is reflected by a change pattern of reflected light intensity.

The aforementioned interaction is enhanced particularly when a functional layer for enabling super-resolution readout, such as the Si layer used in the aforementioned simulation models is provided. In contrast, no or insignificant interaction occurs with a layer incapable of super-resolution readout, such as an Ag layer. Also no or insignificant interaction occurs when the oscillation or polarization direction of the electric field vector of a laser beam is perpendicular to the mark train, but strong interaction occurs when the polarization direction is parallel to the mark train.

A comparison of FIG. 1B with FIG. 1C indicates the presence of another effect different from the aforementioned interaction. The other effect is to increase the intensity of reflected light at long marks of a size equal to or above the resolution limit and reduce the intensity of reflected light at long spaces of a size equal to or above the resolution limit. For convenience sake, the aforementioned interaction is designated as first effect and the other effect is designated as second effect. It is believed that the second effect is not substantially exerted with minute marks and spaces of a size below the resolution limit.

A comparison of FIG. 1B with FIG. 1C reveals that the reflected light intensity arising from the second effect is less dependent on the polarization direction when reflected from long spaces and more dependent on the polarization direction when reflected from long marks. It is noted that the light intensity change pattern based on the second effect is not dependent on the polarization direction. That is, the reflected light intensity increases at long marks and decreases at long spaces, regardless of the polarization direction.

As compared with the first effect, the second effect has substantial influence on the reflected light intensity, and the influence of the second effect on the (decreasing or increasing) direction of reflected light intensity change is reverse to the influence of the first effect. Then, as shown in FIG. 1C, the light intensity change by the first effect at a short space is hidden by the light intensity change by the second effect at the long mark located adjacent to the short space. Also, as shown in FIG. 2C, the light intensity change by the first effect at a short mark is hidden by the light intensity change by the second effect at the long space located adjacent to the short mark. Accordingly, from a short mark-and-space train consisting of a total number "n" of short spaces and short marks and located adjacent to long marks or long spaces, only (n−2) peaks indicative of light intensity changes appear, and omission of signals occurs.

The present invention aims to recover the signals that are omitted in this way. Now that the first effect is substantially exerted only on short marks and short spaces, the reflected light intensity change pattern based on the first effect has polarization dependency, the second effect is substantially exerted only on long marks and long spaces, and the reflected light intensity change pattern based on the second effect has no polarization dependency; the present invention carries out signal processing operation of extracting the light intensity change brought by the first effect which has been buried in the light intensity change pattern of $x_0$ component, by eliminating the light intensity change pattern of $y_0$ component from the light intensity change pattern of $x_0$ component. This prevents any signals from being omitted from the short mark-and-space train as shown in FIGS. 1D and 2D.

The results of the aforementioned simulation do not include the results of light interference. Long marks function as phase pits in the above simulation, and the reflected light intensity at long marks decreases due to light interference. On the other hand, short marks cannot be read out utilizing light interference. In actually retrieving information from the medium, the light intensity changes shown in FIGS. 1B, 1C and 1D, respectively, are added to the reflected light intensity change by such light interference.

Provided that the actual light intensity of $x_0$ component is X, this light intensity X is the reflected light intensity change by interference on which the light intensity change pattern shown in FIG. 1C is superposed. Accordingly, in the change pattern of light intensity X, there develop both a light intensity change brought by light interference corresponding to a long mark and a light intensity change corresponding to a short mark as shown in FIG. 1C. Namely, both a long mark and a short mark can be read out.

Provided that the actual light intensity of $y_0$ component is Y, the actual light intensity $(X-\alpha_{LM}Y)$ is the reflected light intensity change by interference (this intensity is the original intensity multiplied by $(1-\alpha_{LM})$) on which the light intensity change pattern shown in FIG. 1D is superposed. Accordingly, in the change pattern of light intensity $(X-\alpha_{LM}Y)$, there develop both a light intensity change corresponding to a long mark and light intensity changes corresponding to all marks and spaces included in the short mark-and-space train. Then, all marks can be read out.

Although a mark train consisting of pits has been verified in the aforementioned simulation, the present invention is effectively applicable to the reading out of a mark train consisting of marks other than pits, for example, a mark train consisting of amorphous recorded marks formed in a crystalline recording layer of a phase change optical recording disk. It is presumed that since the complex index of refraction differs between amorphous and crystalline states, the irradiation of a laser beam to the recording layer results in an electric field which is strongly localized near the boundary between an amorphous recorded mark and the surrounding crystalline material. This localization of the electric field is dependent on the polarization direction like the localization of the electric field associated with pits. Therefore, a reflected light intensity change by the first effect also occurs with the short mark-and-space train in the phase change recording layer. On the other hand, long marks invite a lowering of reflected light intensity due to the difference of reflectance from the surrounding crystalline material. Accordingly, the present invention is applicable to phase change media as well.

In the aforementioned simulation, $x_0$ component having a polarization direction parallel to the mark train and $y_0$ component having a polarization direction perpendicular to the mark train are used to exaggerate the polarized light dependence. However, any linearly polarized light taken out arbitrarily from the laser beam reflected by the mark train is regarded as the resultant of $x_0$ and $y_0$ components. Accordingly, the benefits of the present invention are attainable, as will be described below, using two types of linearly polarized light taken out arbitrarily from the laser beam reflected by the mark train and having different angles between the polarization direction and the mark train.

It is now assumed that, of the two types of linearly polarized light, one having smaller θ is designated x polarized light and the other having larger θ is designated y polarized light, the intensity of x polarized light is X, and the intensity of y polarized light is Y. The x polarized light includes at least $x_0$ component, and the y polarized light includes at least $y_0$ component. In this case, a change of $(X-\alpha Y)$ reflects the light intensity change pattern which is extracted from the change pattern of $x_0$ component and given by those marks and/or spaces which have not been read out only with $x_0$ polarized light. Accordingly, using $(X-\alpha Y)$, the mark train can be read out on the basis of a difference between the light intensity change pattern of $x_0$ component and the light intensity change pattern of $y_0$ component. Then, those marks and/or spaces which have not been read out only with x polarized light can be read out.

To increase the read output of minute marks, better results are obtained as the angle $\theta$ of x polarized light becomes closer to 0° and the angle $\theta$ of y polarized light becomes closer to 90°. Specifically, the angle $\theta$ of x polarized light is preferably from 0° to less than 45°, and then, the angle $\theta$ of y polarized light is preferably from more than 45° to 90°. It is most preferred that the angle $\theta$ of x polarized light be 0° and the angle $\theta$ of y polarized light be 90°, that is, to use x polarized light consisting solely of $x_0$ component and y polarized light consisting solely of $y_0$ component. However, sufficiently high read outputs of minute marks are obtainable as long as the angle $\theta$ of x polarized light is from 0° to 5° and the angle $\theta$ of y polarized light is from 85° to 90°.

In taking two types of linearly polarized light having different $\theta$ out of the light reflected by the mark train, a polarizing beam splitter is generally used. The two types of polarized light separated by the polarizing beam splitter have orthogonal polarization directions.

On the other hand, in the case of readout operation utilizing only the characteristic light intensity change of $x_0$ component shown in FIG. 1C, the mark train may be read out by taking linearly polarized light having $\theta$ of from 0° to less than 90° out of the laser beam reflected by the mark train and utilizing the light intensity change of this linearly polarized light. Since this linearly polarized light includes $x_0$ component, the light intensity change pattern of this linearly polarized light reflects the pattern shown in FIG. 1C. Accordingly, even when only this linearly polarized light is used, readout of a minute pattern is possible like the case where only $x_0$ polarized light is used. To increase the read output of minute marks, better results are obtained as the angle $\theta$ of the linearly polarized light becomes closer to 0°, and specifically, when $\theta$ is preferably from 0° to less than 45°, more preferably from 0° to 5°, and most preferably 0°.

The present invention is effective for reading out a mark train including at least marks of a size below the resolution limit, that is, a mark train wherein the shortest mark length $M_L$ is less than $0.25\lambda/NA$. Understandably, the first effect dependent on the polarization direction of a laser beam is exerted relatively strongly on marks having a size equal to or above the resolution limit, as long as the mark length is approximate to the resolution limit. For marks having a size of such order, conventional readout methods are difficult to increase read outputs. Accordingly, the present invention is also effective for reading out a mark train wherein the shortest mark length $M_L$ is equal to or above the resolution limit ($0.25\lambda/NA$). However, the first effect becomes weak if the shortest mark length $M_L$ is too long. Then the shortest mark length $M_L$ is given an upper limit of $0.36\lambda/NA$ which is slightly greater than the resolution limit, and is preferably up to $0.31\lambda/NA$.

To utilize the readout method of the invention, a readout apparatus comprising at least means for detecting linearly polarized light including $x_0$ component is used. When a mark train is read out using two types of linearly polarized light having different $\theta$, a readout apparatus comprising means for independently detecting two types of linearly polarized light having different $\theta$ is used.

Figure 3:
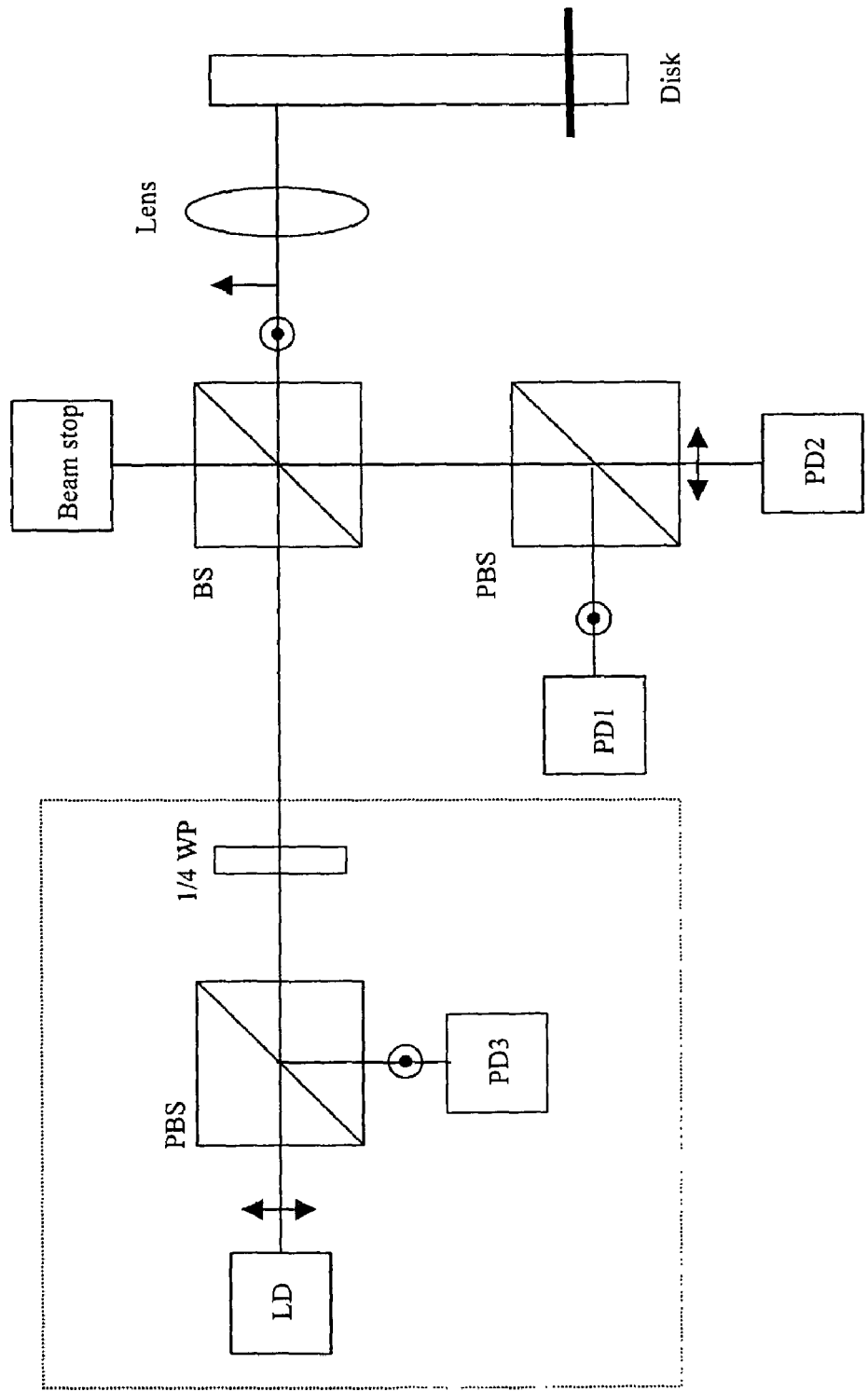
FIG. 3 illustrates a readout apparatus according to one embodiment of the invention.

FIG. 3 illustrates the arrangement of a readout apparatus used in the practice of the readout method of the invention. The readout apparatus includes a laser diode LD for emitting linearly polarized light which passes through a polarizing beam splitter PBS and a quarter waveplate ¼WP for conversion to circularly polarized light. The circularly polarized light enters a beam splitter BS. A light component that has passed straight ahead through the beam splitter BS is focused at the surface of a disk through a lens. The beam splitter BS is not a polarizing beam splitter, but has a function of dividing light into two directions like a half mirror. Of the circularly polarized light entering the beam splitter BS, a light component reflected upward as viewed in the figure is absorbed by a beam stop so that no scattering light prevails within the apparatus.

Of the circularly polarized light reflected by the medium surface, a light component turned downward as viewed in the figure by the beam splitter BS enters a second polarizing beam splitter PBS where it is divided into two types of linearly polarized light having orthogonal polarization directions which enter photodiodes PD1 and PD2, respectively. By processing the signals from the photodiodes PD1 and PD2, a readout operation based on $(X-\alpha Y)$ is enabled.

On the other hand, of the circularly polarized light reflected by the medium surface, a light component that has passed straight ahead through the beam splitter BS enters the quarter waveplate ¼WP again for conversion to linearly polarized light. The linearly polarized light enters the polarizing beam splitter PBS where it is reflected downward as viewed in the figure and enters a photodiode PD3. Therefore, the laser beam is not fed back to the laser diode LD. It is noted that although the provision of the photodiode PD3 is not essential, the photodiode PD3 may be utilized for the purpose of tracking servo or focusing servo.

Figure 4:
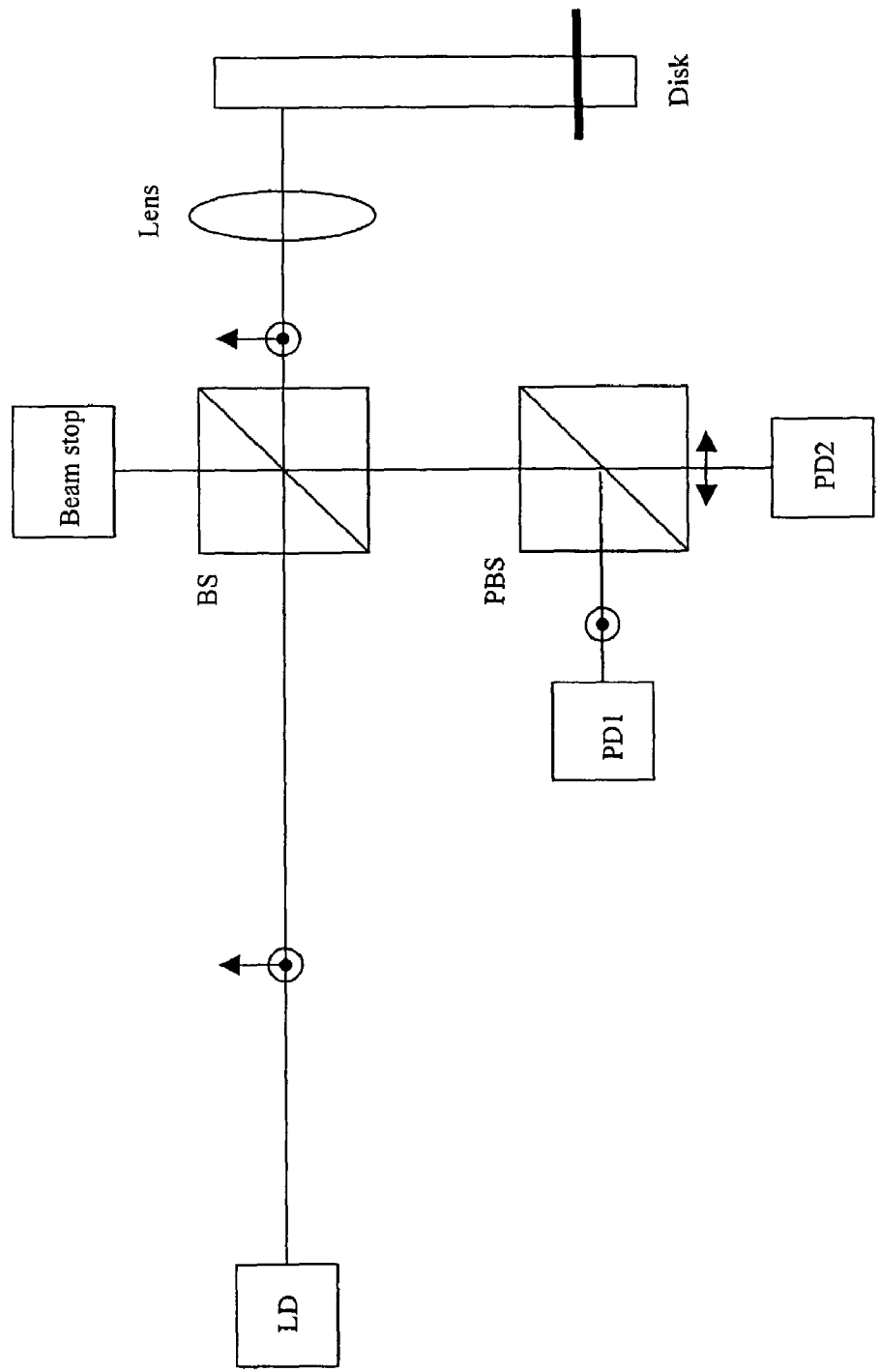
FIG. 4 illustrates a readout apparatus according to another embodiment of the invention.

FIG. 4 illustrates the arrangement of another readout apparatus used in the practice of the readout method of the invention. In this readout apparatus, linearly polarized light emitting from a laser diode LD has a polarization direction which is inclined at an angle of 45° with respect to the plane of paper. Of this linearly polarized light, a light component that has passed straight ahead through a beam splitter BS is focused at the surface of a disk through a lens.

Of the linearly polarized light reflected by the medium surface, a light component turned downward as viewed in the figure by the beam splitter BS enters a polarizing beam splitter PBS where it is divided into two types of linearly polarized light having orthogonal polarization directions which enter photodiodes PD1 and PD2, respectively. By processing the signals from the photodiodes PD1 and PD2, a readout operation based on $(X-\alpha Y)$ is enabled.

Described below is one exemplary construction of the medium to which the readout method of the invention is applied.

The medium to which the invention is applied requires that the light intensity change pattern of $x_0$ component differ from the light intensity change pattern of $y_0$ component as shown in FIGS. 1B and 1C while the remaining construction is not critical. Exemplary are the media described in, for example, the above-cited JP-A 2001-250274 and Jpn. J. Appl. Phys., Vol. 40 (2001), pp. 1624–1628.

These media have a layer (functional layer) constructed of a specific material and having a specific thickness corresponding to the specific material. The specific material is preferably an element selected from among Nb, Mo, W, Mn, Pt, C, Si, Ge, Ti, Zr, V, Cr, Fe, Co, Ni, Pd, Sb, Ta, Al, In, Cu, Sn, Te, Zn and Bi, or an alloy or compound containing at least one such element. As the alloy or compound, phase change materials capable of crystalline-amorphous transition may also be used as previously described.

BENEFITS OF THE INVENTION

When pits or recorded marks having a size approximate to or below the resolution limit are read out, the present invention allows high outputs to be produced and prevents omission of readout signals.

Japanese Patent Application No. 2001-317507 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An information readout method for an optical information medium comprising an information recording layer having a mark train of marks and spaces, said method comprising the steps of scanning the mark train with a laser beam, and reading out the mark train on the basis of a light intensity change pattern of reflected laser beam, wherein
provided that the laser beam reflected by the mark train includes polarized light components which define an angle $\theta$ with the mark train, a polarized light component giving $\theta=0°$ is designated $x_0$ component, and a polarized light component giving $\theta=90°$ is designated $y_0$ component,
the mark train is read out utilizing at least a light intensity change of $x_0$ component.

2. The information readout method of claim 1 wherein linearly polarized light having an angle $\theta$ of from 0° to less than 90° is taken out of the laser beam reflected by the mark train, and the mark train is read out utilizing at least a light intensity change of said linearly polarized light.

3. The information readout method of claim 1 wherein linearly polarized light having an angle $\theta$ of from 0° to less than 45° is taken out of the laser beam reflected by the mark train, and the mark train is read out utilizing at least a light intensity change of said linearly polarized light.

4. An information readout method for an optical information medium comprising an information recording layer having a mark train of marks and spaces, said method comprising the steps of scanning the mark train with a laser beam, and reading out the mark train on the basis of a light intensity change pattern of a reflected laser beam, wherein
provided that the laser beam reflected by the mark train includes polarized light components which define an angle $\theta$ with the mark train, a polarized light component giving $\theta=0°$ is designated $x_0$ component, and a polarized light component giving $\theta=90°$ is designated $y_0$ component, and
linearly polarized light having an angle $\theta$ of from 0° to 5° is taken out of the laser beam reflected by the mark train, and the mark train is read out utilizing at least a light intensity change of said linearly polarized light.

5. The information readout method of claim 4 wherein the mark train includes plural types of marks having different lengths and plural types of spaces having different lengths, and
the mark train is read out on the basis of a difference between the light intensity change pattern of $x_0$ component and the light intensity change pattern of $y_0$ component.

6. The information readout method of claim 5 wherein two types of linearly polarized light having different $\theta$ are taken out of the laser beam reflected by the mark train,
of the two types of linearly polarized light, one having smaller $\theta$ is designated x polarized light and the other having larger $\theta$ is designated y polarized light,
the mark train is read out on the basis of a change of the value obtained by subtracting a multiple of the intensity of y polarized light from the intensity of x polarized light, whereby those marks and/or spaces which cannot be read out solely with x polarized light are read out.

7. An information readout method for an optical information medium comprising an information recording layer having a mark train of marks and spaces, said method comprising the steps of scanning the mark train with a laser beam, and reading out the mark train on the basis of a light intensity change pattern of a reflected laser beam, wherein
provided that the laser beam reflected by the mark train includes polarized light components which define an angle $\theta$ with the mark train, a polarized light component giving $\theta=0°$ is designated $x_0$ component, and a polarized light component giving $\theta=90°$ is designated $y_0$ component,
the mark train includes plural types of marks having different lengths and plural types of spaces having different lengths, two types of linearly polarized light having different $\theta$ are taken out of the laser beam reflected by the mark train,
of the two types of linearly polarized light, one having a smaller $\theta$ than the other linearly polarized light is designated x polarized light and the other having a larger $\theta$ than the one linearly polarized light is designated y polarized light,
the intensity of the x polarized light is X, the intensity of the y polarized light is Y, and X/Y corresponding to the longest mark is $\alpha_{LM}$, and
the mark train is read out on the basis of a change of $(X-\alpha_{LM}Y)$.

8. An information readout method for an optical information medium comprising an information recording layer having a mark train of marks and spaces, said method comprising the steps of scanning the mark train with a laser beam, and reading out the mark train on the basis of a light intensity change pattern of a reflected laser beam, wherein
provided that the laser beam reflected by the mark train includes polarized light components which define an angle $\theta$ with the mark train, a polarized light component giving $\theta=0°$ is designated $x_0$ component, and a polarized light component giving $\theta=90°$ is designated $y_0$ component,
the mark train includes plural types of marks having different lengths and plural types of spaces having different lengths, two types of linearly polarized light having different $\theta$ are taken out of the laser beam reflected by the mark train,
of the two types of linearly polarized light, one having a smaller $\theta$ than the other linearly polarized light is designated x polarized light and the other having a larger $\theta$ than the one linearly polarized light is designated y polarized light, and
the angle $\theta$ for the x polarized light is from 0° to less than 45°, and the angle $\theta$ for the y polarized light is from more than 45° to 90°.

9. An information readout method for an optical information medium comprising an information recording layer having a mark train of marks and spaces, said method comprising the steps of scanning the mark train with a laser beam, and reading out the mark train on the basis of a light intensity change pattern of a reflected laser beam, wherein provided that the laser beam reflected by the mark train includes polarized light components which define an angle θ with the mark train, a polarized light component giving θ=0° is designated $x_0$ component, and a polarized light component giving θ=90° is designated $y_0$ component, the mark train includes plural types of marks having different lengths and plural types of spaces having different lengths, two types of linearly polarized light having different θ are taken out of the laser beam reflected by the mark train, of the two types of linearly polarized light, one having a smaller θ than the other linearly polarized light is designated x polarized light and the other having a larger θ than the one linearly polarized light is designated y polarized light, and the angle θ for the x polarized light is from 0° to 5°, and the angle θ for the y polarized light is from 85° to 90°.

10. An information readout method for an optical information medium comprising an information recording layer having a mark train of marks and spaces, said method comprising the steps of scanning the mark train with a laser beam, and reading out the mark train on the basis of a light intensity change pattern of a reflected laser beam, wherein provided that the laser beam reflected by the mark train includes polarized light components which define an angle θ with the mark train, a polarized light component giving θ=0° is designated $x_0$ component, and a polarized light component giving θ=90° is designated $y_0$ component, and the laser beam having a wavelength λ is irradiated to the mark train through an objective lens having a numerical aperture NA for reading out the mark train, and the minimum length $M_L$ of the marks is up to 0.36λ/NA.

11. An information readout method for an optical information medium comprising an information recording layer having a mark train of marks and spaces, said method comprising the steps of scanning the mark train with a laser beam, and reading out the mark train on the basis of a light intensity change pattern of a reflected laser beam, wherein provided that the laser beam reflected by the mark train includes polarized light components which define an angle θ with the mark train, a polarized light component giving θ=0° is designated $x_0$ component, and a polarized light component giving θ=90° is designated $y_0$ component, and the laser beam having a wavelength λ is irradiated to the mark train through an objective lens having a numerical aperture NA for reading out the mark train, and the minimum length $M_L$ of the marks is less than 0.25λ/NA.

12. The information readout method of claim 1 wherein the marks are formed by changes in shape and/or property of the information recording layer.

13. A readout apparatus for use in the information readout method of claim 1, comprising at least means for detecting linearly polarized light including $x_0$ component.

14. The readout apparatus of claim 13 wherein said means is capable of independently detecting two types of linearly polarized light having different θ.

15. An information readout method for an optical information medium which is one of a read-only optical disk, a phase change optical disk and a write-once optical recording disk, the optical information medium comprising an information recording layer having a mark train of marks and spaces, said method comprising the steps of scanning the mark train with a laser beam, and reading out the mark train on the basis of a light intensity change pattern of a reflected laser beam, wherein provided that the laser beam reflected by the mark train includes polarized light components which define an angle θ with the mark train, a polarized light component giving θ=0° is designated $x_0$ component, and a polarized light component giving θ=90° is designated $y_0$ component, and the mark train is read out utilizing at least a light intensity change of the $x_0$ component.

16. The information readout method of claim 7, wherein the marks are formed by changes in shape andior property of the information recording layer.

17. A readout apparatus for use in the information readout method of claim 7, comprising at least means for detecting linearly polarized light including the $x_0$ component.

18. The readout apparatus of claim 17, wherein said means for detecting linearly polarized light is capable of independently detecting two types of linearly polarized light having different θ.

* * * * *